(12) United States Patent
Mahatme et al.

(10) Patent No.: US 12,001,674 B2
(45) Date of Patent: Jun. 4, 2024

(54) REUSING MEMORY ARRAYS FOR PHYSICALLY UNCLONABLE FUNCTION (PUF) GENERATION

(71) Applicant: NXP USA, Inc., Austin, TX (US)

(72) Inventors: Nihaar N. Mahatme, Austin, TX (US); Anirban Roy, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/050,547

(22) Filed: Oct. 28, 2022

(65) Prior Publication Data

US 2024/0143167 A1    May 2, 2024

(51) Int. Cl.
*G06F 3/00* (2006.01)
*G06F 3/06* (2006.01)
*G06F 9/4401* (2018.01)
*G11C 11/412* (2006.01)
*G11C 11/419* (2006.01)

(52) U.S. Cl.
CPC .......... *G06F 3/0604* (2013.01); *G06F 3/0632* (2013.01); *G06F 3/0679* (2013.01); *G06F 9/4401* (2013.01); *G11C 11/4125* (2013.01); *G11C 11/419* (2013.01)

(58) Field of Classification Search
CPC .... G06F 3/0604; G06F 3/0632; G06F 3/0679; G06F 9/4401; G11C 11/4125; G11C 11/419
See application file for complete search history.

(56) References Cited

U.S. PATENT DOCUMENTS

| | | | |
|---|---|---|---|
| 9,279,850 B1 * | 3/2016 | Pedersen | G01R 27/2605 |
| 9,947,391 B1 | 4/2018 | Mahatme et al. | |
| 10,734,047 B1 | 8/2020 | Mahatme et al. | |
| 11,233,663 B1 | 1/2022 | Hoefler et al. | |
| 2009/0016145 A1 | 1/2009 | Van Uden | |
| 2019/0058603 A1 | 2/2019 | Lin et al. | |
| 2022/0029834 A1 * | 1/2022 | Hoefler | H04L 9/3278 |

OTHER PUBLICATIONS

Claes et al.: "Comparison of SRAM and FF PUF in 65nm technology," Conference: Proceedings of the 16th Nordic conference on Information Security Technology for Application, DOI:10.1007/978-3-642-29615-4_5, Oct. 2011, pp. 1-18.

(Continued)

*Primary Examiner* — Craig S Goldschmidt
(74) *Attorney, Agent, or Firm* — Joanna G. Geld

(57) ABSTRACT

An array of bit cells is programmed with user data, each row including a corresponding word line and each column including a corresponding column line. The array includes a plurality of differential PUF bits, each having a first and second bit cell programmed with user data. A first set of sense-amplifiers outputs a set of data bits of the user data, and a second set of sense-amplifiers outputs a set of differential bits, each differential bit based on a differential current between two columns lines of the selected column lines corresponding to the first and second bit cells of a corresponding differential PUF bit along the selected word line. A potential PUF bit generator outputs a set of potential PUF bits based on the set of data bits of the user data from the first set of sense-amplifiers and the set of differential bits from the second set of sense-amplifiers.

20 Claims, 8 Drawing Sheets

(56) References Cited

OTHER PUBLICATIONS

Schrijen et al.: "Comparative analysis of SRAM memories used as PUF primitives," 2012 Design, Automation & Test in Europe Conference & Exhibition, IEEE, DOI: 10.1109/DATE.2012.6176696, Mar. 12-16, 2012, Dresden, Germany, pp. 1-6.
Mitsuru et al., "Tamper-Resistant Authentication System with Side-Channel Attack Resistant AES and PUF using MDR-ROM", 2015 IEEE International Symposium on Circuits and Systems (ISCAS), May 24, 2015, pp. 1462-1465, IEEE, Piscataway, NJ, USA.

\* cited by examiner

REUSING MEMORY ARRAYS FOR PHYSICALLY UNCLONABLE FUNCTION (PUF) GENERATION

BACKGROUND

Field

This disclosure relates generally to electronic circuits and more specifically to reusing memory arrays for physically unclonable function (PUF) generation.

Related Art

A physically unclonable function (PUF) is a physical system that will produce a unique and predictable response when a stimulus is input. One example of a PUF uses the power-up state of a static random-access memory (SRAM). However, manufacturing variations, temperature, power supply, switching noise, device aging, and other factors may cause some of the cells of the PUF to power-up in different states at different times. Also, an implementation of the SRAM based PUF using a 6-transistor SRAM cell requires a relatively large amount of area on an integrated circuit (IC). Another example of a PUF uses read only memories (ROM) due to their improved stability, noise immunity, and entropy. While a ROM array is generally smaller in size than an SRAM array, each of these solutions still require a dedicated SRAM or ROM array for the PUF.

Because no two integrated circuits are exactly alike, the output of the PUF is difficult to predict, and therefore difficult to recreate. This makes the PUF useful for storing unique information about the IC. For example, the PUF may be used to generate a digital signature or encryption/decryption key. However, the use of a dedicated SRAM or ROM array to implement the PUF consumes additional area and makes discovery of the structure itself (e.g. the dedicated array) on the chip easier. Therefore, a need exists for a way to implement a PUF which reduces power and cost (e.g. area) and provides stable PUF bits which can be reliably sensed, but is more difficult to discover than the currently known dedicated PUF arrays.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a data processing system having a PUF implemented by reusing an existing memory array, such as a ROM array, which has already been programmed with code. The PUF is embedded into the programmed array without affecting the data stored in the programmed array. This eliminates the need for a separate dedicated memory array (SRAM or ROM) thus eliminating the area impact of a dedicated array, also making it more difficult to locate and attempt reverse engineering of the PUF.

In one aspect, the PUF is embedded in a programmed ROM, such as a boot ROM programmed with boot code. Each of the memory cells in the ROM either includes an N-channel transistor having a drain connected to a bit line, a source connected to a source line, and a gate connected to a word line which corresponds to a first programmed logic state of the memory cell or includes no transistor at the intersection of the word line and bit line which corresponds to a second programmed state of the memory cell. The memory cells (also referred to as data cells) are organized into differential PUF bits, in which each PUF bit includes a pair of memory cells. Only those differential PUF bits which include a conductive transistor in both memory cells of the differential PUF bit are usable as a valid differential PUF bit, and all other differential PUF bits of the ROM array are not valid as differential PUF bits. Although each memory cell of a valid differential PUF bit stores the same logic state, due to manufacturing variations, the pair of memory cells do not match exactly in drive strength. As a result, the resulting differential current through the memory cells of a valid differential PUF bit during a read operation indicates the stored bit value of the valid differential PUF bit.

In one embodiment, after the ROM is programmed with boot code and any other additional system-on-chip (SoC) code or parameters, an enrollment process is performed in which valid differential PUF bits embedded in the programmed ROM array are identified and filtered from the non-valid differential PUF bits of the ROM array. Additional screening can also be applied to the identified valid differential PUF bits to determine which are most robust. "Good" addresses of the programmed ROM array can then be identified which address data units which include robust valid differential PUF bits (but no non-robust valid differential PUF bits). The resulting robust valid differential PUF bits can then be used to generate a unique digital code for the chip.

Figure 1:
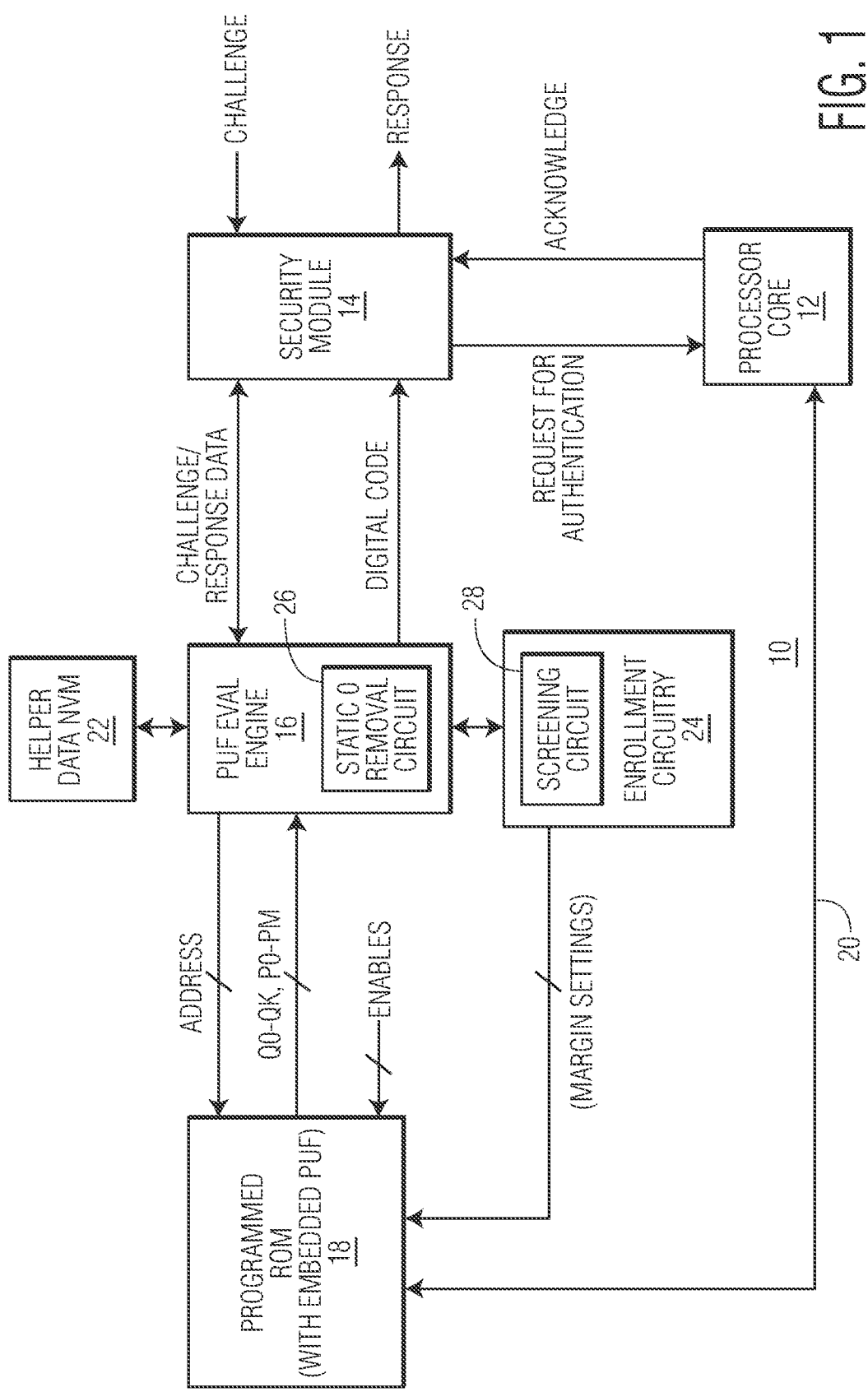
FIG. 1 illustrates a data processing system in accordance with an embodiment of the present invention.

FIG. 1 illustrates a data processing system 10 in accordance with an embodiment, in which data processing system 10 may be implemented as a system-on-chip (SoC) or an integrated circuit (IC) and may therefore be referred to as an SoC or an IC. Data processing system 10 (also referred to as system 10) includes processor core 12, security module 14, PUF evaluation engine 16, a programmed ROM 18, enrollment circuitry 24, and helper data storage circuitry 22. In one embodiment, helper data storage circuitry 22 is implemented with a non-volatile memory (NVM) such as electrically programmable fuses (e-fuses), and may therefore be referred to herein as helper data NVM 22 or NVM 22). Processor core 12 can be any kind of processor core, or a plurality of cores, for executing instructions. Processor core 12 (or other cores of system 10) can be bidirectionally coupled programmed ROM 18, via, for example, a system interconnect 20. System interconnect 20 can be any type of interconnect such as a bus, cross-bar switch, interconnect fabric, or the like. Core 12 or any other core can access programmed ROM 18 to obtain boot code or other programmed SoC code upon start up or during normal operation to obtain any code or parameters as needed during operation. Programmed ROM 18 also includes an embedded PUF which is accessible by PUF evaluation engine 16. However, note that any code programmed on ROM 18 is not affected by the embedded PUF and vice versa in that the embedded PUF does not affect the code programmed on ROM 18.

Processor core 12 is also coupled to security module 14 to provide an acknowledge signal ACKNOWLEDGE when a request for authentication (REQUEST FOR AUTHENTICATION) is provided by security module 14. Security module 14 provides the REQUEST FOR AUTHENTICATION in response to receiving a challenge signal (CHALLENGE) from a requestor. PUF evaluation engine 16 may provide response data RESPONSE DATA in response to the CHALLENGE. To get the RESPONSE DATA, PUF evaluation engine 16 provides a PUF address (ADDRESS) to programmed ROM 18 (in which the PUF addresses are received from NVM 22 or generated from helper data in NVM 22). In response, programmed ROM 18 provides a PUF response from a PUF embedded in programmed ROM 18 as a plurality of output signals (Q0-QK, P0-PK) back to PUF evaluation engine 16. PUF evaluation engine 16 includes a static zero ('0') removal circuit 26 and evaluates and processes the response to generate a digital code (DIGITAL CODE) from the plurality of output signals from programmed ROM 18. The digital code is provided to security module 14 and used by security module 14 to generate a unique chip ID, encryption/decryption key, digital signature, or the like as a response (RESPONSE).

Enrollment circuitry 24, along with PUF evaluation engine 16, performs an enrollment on PUF 18 to determine which differential PUF bits embedded in programmed ROM 18 are both valid and are sufficiently stable, and information identifying these stable (i.e. robust) valid differential PUF bits is stored as helper data in NVM 22 (either by PUF evaluation engine 16 or enrollment circuitry 24). Those robust differential PUF bits indicated by the helper data in NVM 22 are used by PUF evaluation engine 16 to obtain the PUF response from programmed ROM 18 which is used to generate the digital code. During the enrollment, screening circuit 28 of enrollment circuitry 24 may communicate information (e.g. different margin settings) to programmed ROM 18 so as to additionally screen the identified valid differential PUF bits.

Data processing system 10 may also include other circuits and modules not illustrated in FIG. 1. For example, data processing system 10 may include input/output circuits, memory, analog-to-digital converters, phase-locked loops, and the like, depending on the application. Also, programmed ROM 18 can be any type of memory programmed with any type of user data which can additionally include an embedded PUF, and may therefore be referred to more generally as a programmed memory or programmed memory array. For example, programmed ROM 18 may be programmed with other code or parameters in addition to or in place of the boot code for the SoC. As used herein, programmed ROM 18 may be referred to simply as ROM 18. (If ROM 18 is programmed with boot code, it may also be referred to as a boot ROM.) Also, rather than a ROM, any NVM can be used, such as, for example, a magneto-resistive RAM (MRAM), flash memory, or the like, or can be a different type of memory such as an SRAM, dynamic RAM (DRAM), or the like.

Figure 2:
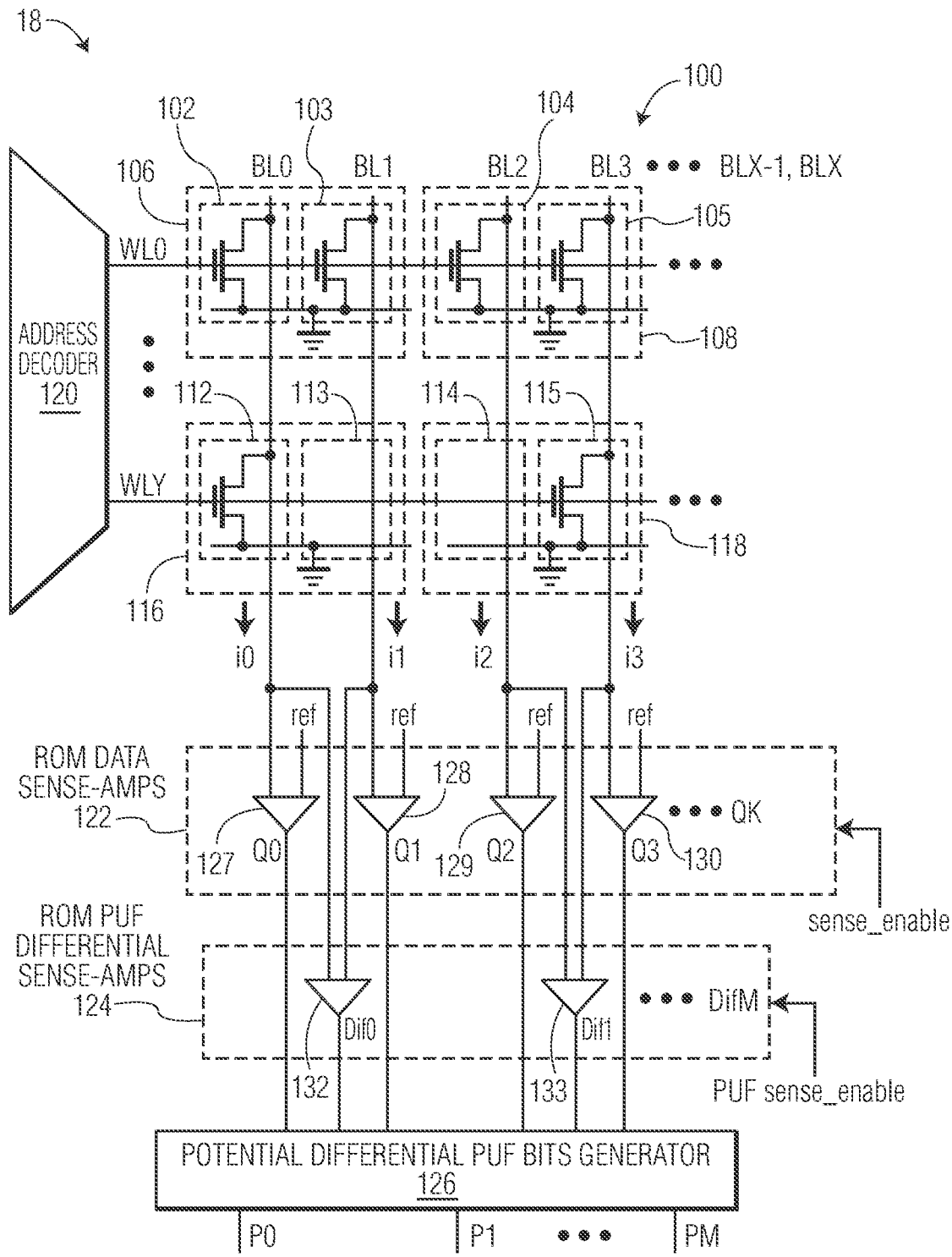
FIG. 2 illustrates a programmed ROM of FIG. 1 in accordance with an embodiment of the present invention.

FIG. 2 illustrates ROM 18 of FIG. 1 in accordance with an embodiment. ROM 18 includes a memory array 100, address decoder 120 (which may also include word line drivers), ROM data sense amplifiers 122, ROM PUF differential sense amplifiers 124, and a potential differential PUF bits generator 126. Memory array 100 includes an array of memory cells arranged in Y+1 rows and X+1 columns, in which a memory cell is located at the intersection of each row and columns. (Each of Y and X can be any integer value greater than or equal to two.) Since ROM 18 is a programmed ROM, each memory cell of array 100 is already programmed with user data (e.g. boot code or other code) and therefore may or may not include a transistor (e.g. an N-channel transistor), depending on its programmed value. For example, if a transistor is present in a memory cell, a drain electrode is coupled to a corresponding bit line, a source electrode is coupled to a corresponding source line (which is coupled to ground in the illustrated embodiment), and a gate electrode is coupled to a corresponding word line, and indicates that the memory cell is programmed to a first logic state (e.g. a logic zero). If a transistor is not present in a memory cell, the memory cell is programmed a second logic state (e.g. a logic one). (Alternatively, the presence of a transistor can instead indicate a logic zero and the absence of a transistor a logic zero.) Therefore, in the illustrated embodiment, memory cells 102-105, 112, and 115 each store a logic zero, while memory cells 113 and 114 store a logic one. Note that a memory cell of array 100 may also be referred to as a data cell or a bit cell, and stores a bit of the programmed code.

A row of array 100 includes a word line and all the cells along the word line. For example, in array 100, one row includes a word line WL0 and memory cells 102-105 located along word line WL0. Another row includes word line WLY and memory cells 112-115 along WLY. Likewise, a column of array 100 includes a column line (which may either be a bit line (BL) or a source line (SL)) and all the memory cells along that column line. For example, one column includes a bit line BL0 and memory cells 106 and 112. Another column includes bit line BL1 and memory cells 103 and 113. Similarly, another column includes a bit line BL2 and memory cells 104 and 114. Another column includes a bit line BL3 and memory cells 105 and 115. While only eight memory cells are illustrated in FIG. 2, array 100 may include any number of memory cells, as defined by the number of rows and columns.

Array 100 is arranged such that two single-bit memory cells together form a potential differential PUF bit, each potential differential PUF bit coupled to a corresponding word line, a corresponding bit line pair (e.g. bit lines of neighboring columns), and a corresponding source line pair (e.g. source lines of neighboring columns). For example, memory cells 102 and 103 together form a potential differential PUF bit 106 corresponding to PUF bit00. That is, both cells 102 and 103 store one potential PUF bit. As another example, memory cells 112 and 113 together form potential differential PUF bit 116. Memory cells 104 and 105 together form potential differential PUF bit 108, and memory cells 114 and 115 together form potential differential PUF bit 118. Therefore, array 100 stores an array of potential differential PUF bits, in which each potential differential PUF bit uses two memory cells (e.g. neighboring memory cells along a row in the illustrated embodiment). Potential differential PUF bits are also arranged in rows and columns, in which a potential differential PUF bit is located at each intersection of a WL and a pair of bit columns (in which the differential bit column includes a corresponding pair of neighboring bit lines, a pair of neighboring source lines). In the illustrated embodiment, each potential differential PUF bit includes two neighboring bit cells, but alternatively can be arranged differently such that the two bits cells of a differential PUF bit may not be neighboring, i.e., may not be immediately adjacent each other.

Note that all the potential differential bit cells are formed from two bit cells of the memory which are also capable of storing user data. Therefore, each bit cell or memory cell of array 100 is capable of storing a bit of user data while also storing part of a potential differential PUF bit. That is, array 100 is capable of being used for two functions, storing of user data as well as supplying an embedded PUF, in which at least a portion of array 100 stores both user data and a portion of the embedded PUF simultaneously. As used herein, user data can be any data which is accessed or used by any part of data processing system 10 during operation of data processing system 10. For example, user data (i.e. programmed data) can include code (e.g. boot code), status, control, or configuration information, parameters, etc., or any combinations thereof that are programmed at the manufacturing stage. Memory array 100 can therefore store any type of user data, and in addition, include an embedded PUF.

The potential differential PUF bits described above are referred to as "potential" or "candidate" differential PUF bits because only those potential (i.e. candidate) differential PUF bits whose memory cells both include a transistor provide a valid differential PUF bit, as will be described in more detail below. Therefore, in one embodiment, in which the presence of a transistor in a bit cell indicates a zero bit, only those potential differential PUF bits whose memory cells both store a logic zero can provide a valid differential PUF bit. Note that the valid differential PUF bits of array 100 is a subset of the potential differential PUF bits of array 100. In the illustrated embodiment of FIG. 2, potential differential PUF bits 102/103 and 104/105 form valid differential PUF bits, but potential differential PUF bits 112/113 and 114/115 do not. Note that in the case of a valid differential PUF bit of ROM 18, the two transistors in the PUF cells of the valid differential PUF bit are identically drawn, in that they match in size, type, and materials. However, as described above, due to process variations, the two identical transistors include inherent mismatch, resulting in differences in drive strength of the transistors which cause a current difference between the bit lines of a differential PUF bit. It is this difference in current that is detected to determine a stored logic state of the valid differential PUF bit. Since the transistors are identically drawn, though, reverse engineering cannot easily determined the logic state of the PUF bit.

The X+1 bit lines BL0-BLX are coupled to ROM data sense-amplifiers (sense-amps) 122 including K+1 sense amplifiers, in which, during a read operation, each bit line of the selected set of bit lines of BL0-BLX is coupled to a corresponding sense amplifier, 127-130, respectively. In one embodiment, BL0-BLX is each coupled directly to a corresponding sense amplifiers of sense amplifiers 127-130, respectively. In another embodiment, each bit line of a column is coupled to sense-amps 122 by way of a corresponding column MUX. In this case, column MUXes are located between array 102 and the sense-amps, in which the column MUXes receive a column address which results in coupling a group of K+1 selected bit lines from array 100 to corresponding sense amplifiers of the K+1 sense-amps 122.

Each sense amplifier of sense-amps 122 receives a reference signal and a sense enable signal which, when asserted, enables sensing by the sense amplifiers in order to provide the output data from array 100, e.g. Q0-OK. Each of Q0-OK provides one bit of data stored in array 100 at the selected bit cells at the intersections of the selected word line and selected bit lines, based on comparisons between the sensed read currents (or voltages) and the reference signal. Therefore, ROM DATA sense-amps 122 are enabled to perform normal reads from ROM 18 to access the data (e.g. boot code) stored in programmed ROM 18. A read access request with a corresponding read access address can be provided to control circuitry of ROM 18 (not shown) which returns the data stored at the read access address in ROM 18. Any known methods and circuitry can be used to perform normal reads from ROM 18, and the existence of embedded PUFs does not affect accessing ROM 18 for normal reads.

In addition to ROM data sense-amps 122, ROM 18 includes ROM PUF differential sense-amps 124 in which the selected bit lines for a PUF read are coupled to both ROM data sense-amps 122 and to ROM PUF differential sense-amps 124. Note that, for normal reads, ROM PUF differential sense-amps are not used. For PUF reads during PUF enrollment and evaluation, though, selected bit lines are coupled to both sense-amps 122 and 124, in which, as described above, they can be coupled directly to the sense-amps or coupled via column MUXes. ROM PUF differential sense-amps 124 includes M+1 differential sense-amplifiers, such as 132 and 133. Each PUF differential sense-amp is coupled to a pair of neighboring bit lines and provides a corresponding output bit based on comparing the currents of the pair of neighboring bit lines (i.e. based on its differential input bit lines).

For example, differential sense-amp 132 is coupled to BL0 and BL1, and compares the currents i0 and i1 of the selected neighboring memory cells along the selected word line. If WL0 is selected, the currents i0 and i1 are provided by the pair of memory cells 102 and 103, respectively (in which cells 102/103 form a valid differential PUF bit). In one embodiment, if i0 is greater than i1, then the output bit of sense-amp 132, Dif0, is a logic level one, otherwise, Dif0 is a logic level zero. Similarly, sense amp 133 is coupled to BL2 and BL3 in which i2 and i3 from neighboring bit cells along a selected word line are compared to provide Dif1 (if i2>i3, Dif1=1, else Dif1=0). Therefore, PUF differential sense-amps 124 provides M+1 output bits, Dif0-DifM, in which M=K/2. In the illustrated embodiment, in which X=K such that each bit line is directly coupled to a corresponding sense amp of ROM data sense-amps 122, M=X/2. Any known differential sense-amp can be used for ROM PUF differential sense-amps 124 which are capable of amplifying and detecting the current or voltage difference between two transistors of a valid differential PUF bit.

For PUF enrollment and PUF evaluations, to be described in more detail below, all of Q0-Qk and Dif0-DifM are provided to potential differential PUF bits generator 126 which outputs potential differential PUF bits P0-PM corresponding to each of Dif0-DifM. In one embodiment, each of P0-PM is based on Dif0-DifM, respectively, as well as the corresponding pair of data bits (two consecutive bits of Q0-OK, respectively). For example, P0 is determined based on Dif0 as well as the pair of Q0 and Q1, and P1 is determined based on Dif1 as well as the next consecutive pair of Q2 and Q3. As discussed above, only those potential differential PUF bits whose memory cells both store a zero qualify as a valid differential PUF bit. Therefore, a set of i+1 valid differential PUF bits VP0-VPi are determined from P0-PM. (Note that potential differential PUF bits, P0-PM, and valid differential PUF bits, VP0-VPi, may also be more simply referred to as potential PUF bits and valid PUF bits, respectively.)

Figure 3:
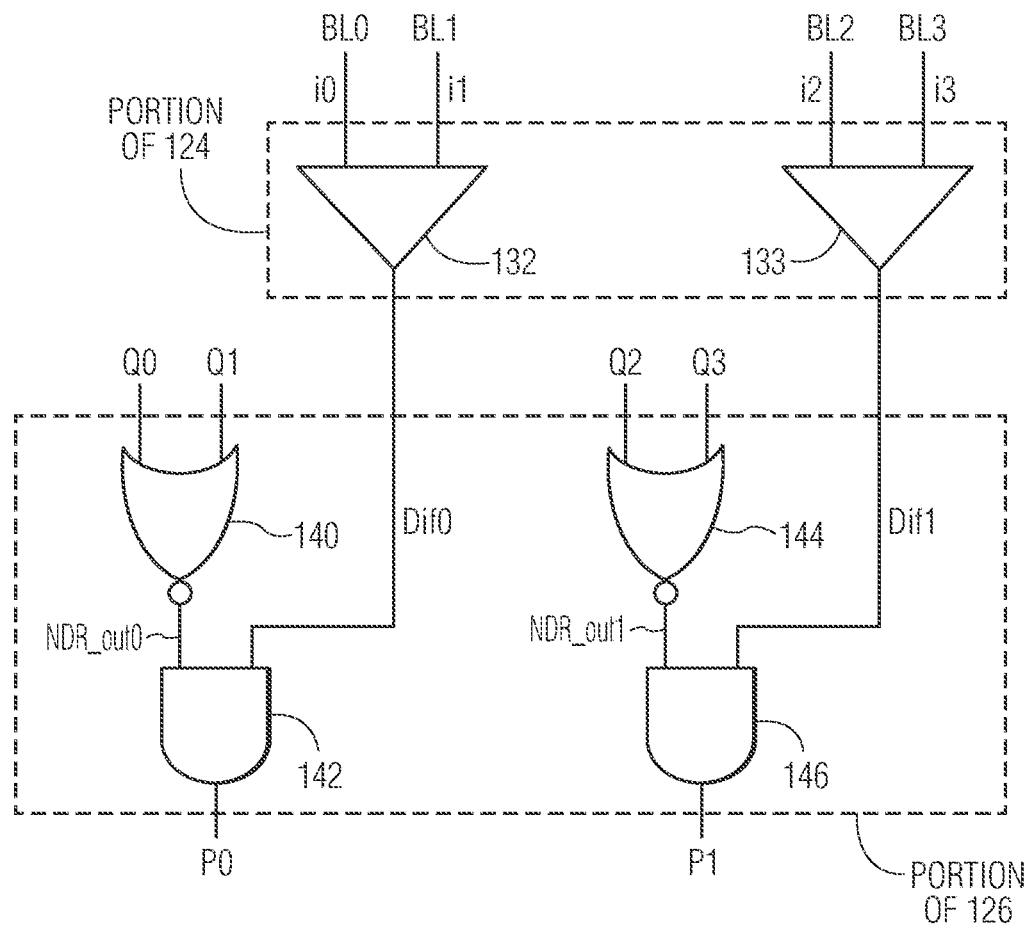
FIG. 3 illustrates a portion of the programmed ROM of FIG. 2 in accordance with an embodiment of the present invention.

FIG. 3 illustrates, in schematic form, a portion of ROM PUF differential sense-amps 124 (including sense-amps 132 and 133) and a portion of potential differential PUF bits generator 126 which generate potential differential PUF bits P0 and P1. The illustrated portion of potential differential PUF bits generator 126 includes NOR gates 140 and 144 and AND gates 142 and 146. NOR gate 140 receives Q0 at a first input and Q1 at a second input and outputs NOR_out0, and AND gate 142 has a first input coupled to receive NOR_out0 and a second input coupled to receive Dif0. AND gate 142 provides P0 at its output. NOR gate 144 receives Q2 at a first input and Q3 at a second input and outputs NOR_out1, and AND gate 144 has a first input coupled to receive NPR out1 and a second input coupled to receive Dif1. AND gate 146 provides P1 at its output. Each of NOR_out2-NOR_outM and P2-PM are generated in a similar manner, in which, e.g., P2 is generated by ANDing NOR_out2 (based on Q4 and Q5) with Dif2, P3 is generated by ANDing NOR_out3 (based on Q6 and Q7) with Dif3, etc.

In operation, referring to P0 as an example, when Q0 and Q1 are both 0, then both the corresponding selected memory cells include a transistor and NOR_out0 is one. In this case, AND gate 142 provides the output of the comparison between i0 and i1 as P0. That is, Dif0 is passed on as P0. However, if either of Q0 and Q1 is a one, then at least one of the selected memory cells of the candidate differential PUF bit lacks a transistor, meaning it is not a valid differential PUF bit. In this case, the NOR_out0 is zero, masking any value of Dif0 such that P0 remains fixed at a static zero (regardless of the values of i0 and i1). Similarly, if either Q2 or Q3 is a one, then at least one of the selected memory cells of the candidate differential PUF bit lacks a transistor, meaning it is not a valid differential PUF bit. In this manner, each of NOR_out0-NOR_outM can also be used to indicate whether each of P0-PM, respectively, is a valid differential PUF bit or not. Therefore, for each selected row of WL0-WLY, P0-PM is provided indicating the potential differential PUF bits on that row and NOR_out0-NOR_outM is provided to indicate which of P0-PM, respectively, are valid differential PUF bits, VP0-VPi.

Figure 4:
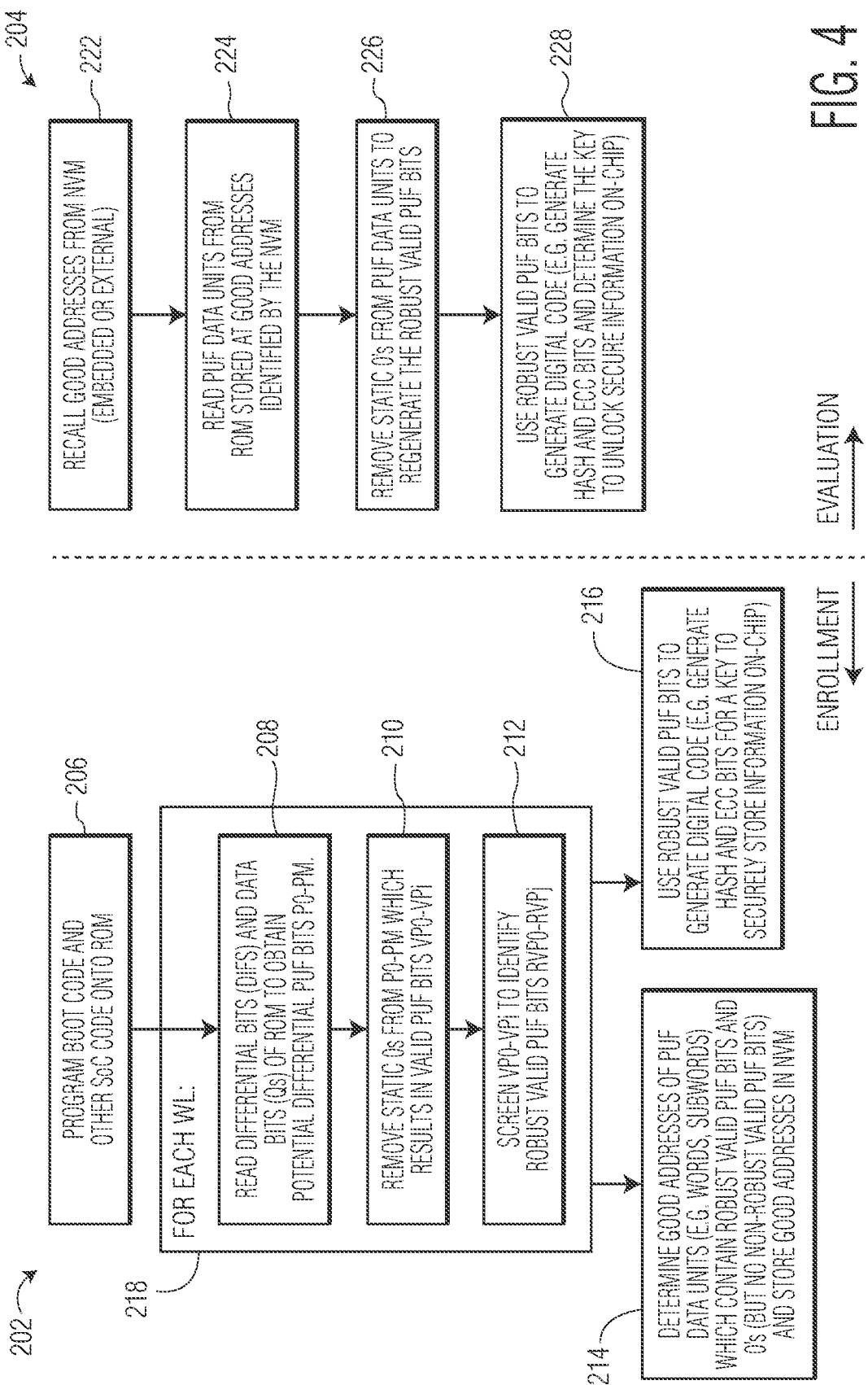
FIG. 4 illustrates, in flow diagram form, a method of performing enrollment and evaluation, in accordance with an embodiment of the present invention.

FIG. 4 illustrates, in flow diagram form, a method 202 of performing a PUF enrollment on ROM 18 and a method 204 of performing a PUF evaluation on ROM 18. Evaluation on ROM 18 is a process that is used to identify robust valid PUF bits, in which addresses for those robust valid PUF bits are stored in NVM 22. Also during enrollment, the robust valid PUF bits can be used to generate a unique digital code for the chip containing ROM 18, in which that digital code can be used to generate hash and ECC bits for key which can then be used to securely store information on-chip. Evaluation is the process used to extract the robust valid PUF bits, using NVM 22, so that the digital code can be regenerated. Enrollment may occur, for example, during final testing of ROM 18, prior to normal operation in the field, while evaluation occurs during normal operation in the field.

Figure 5:
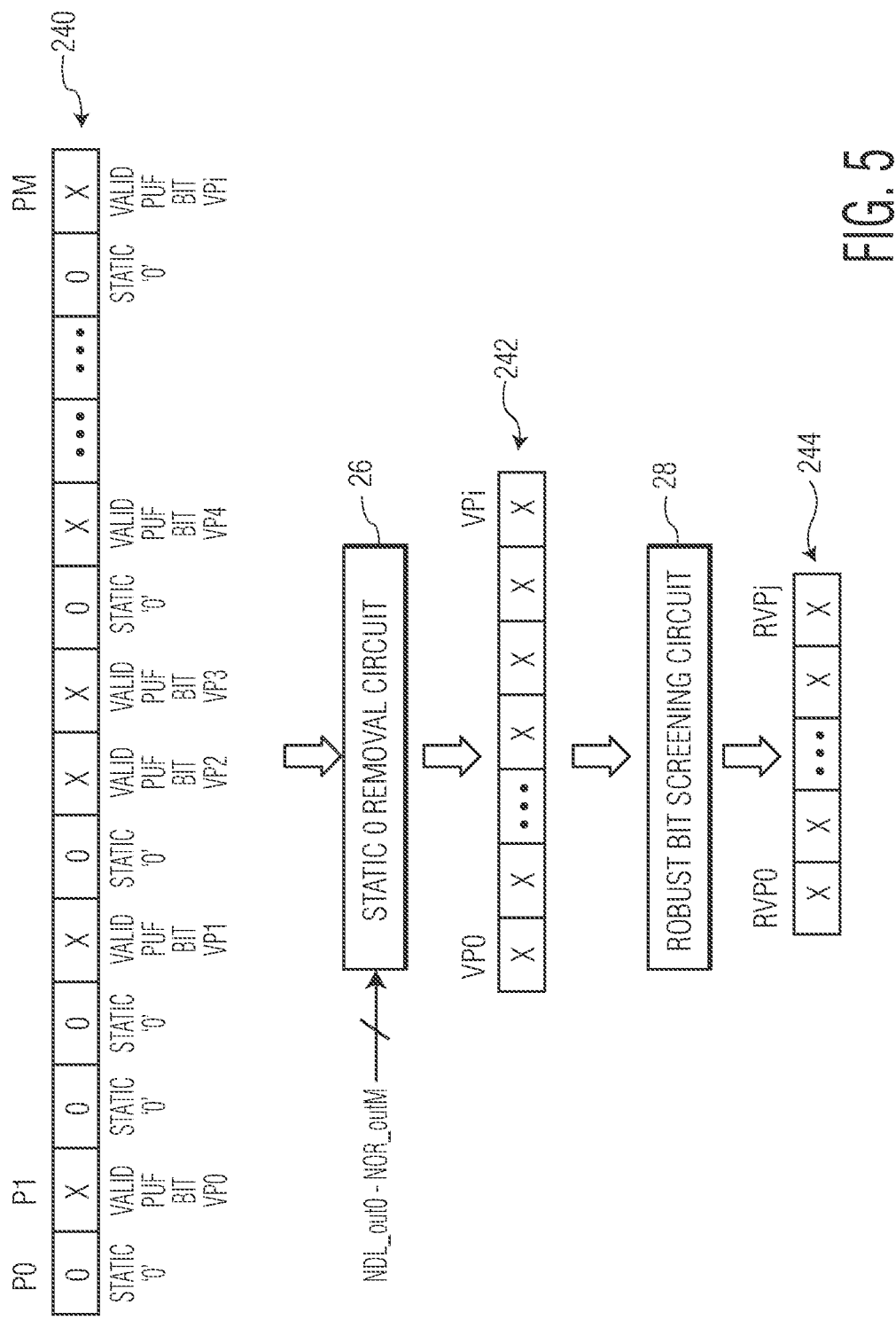
FIG. 5 illustrates, in diagrammatic form, a data flow corresponding to the enrollment method of FIG. 4, in accordance with an embodiment of the present invention.
Figure 6:
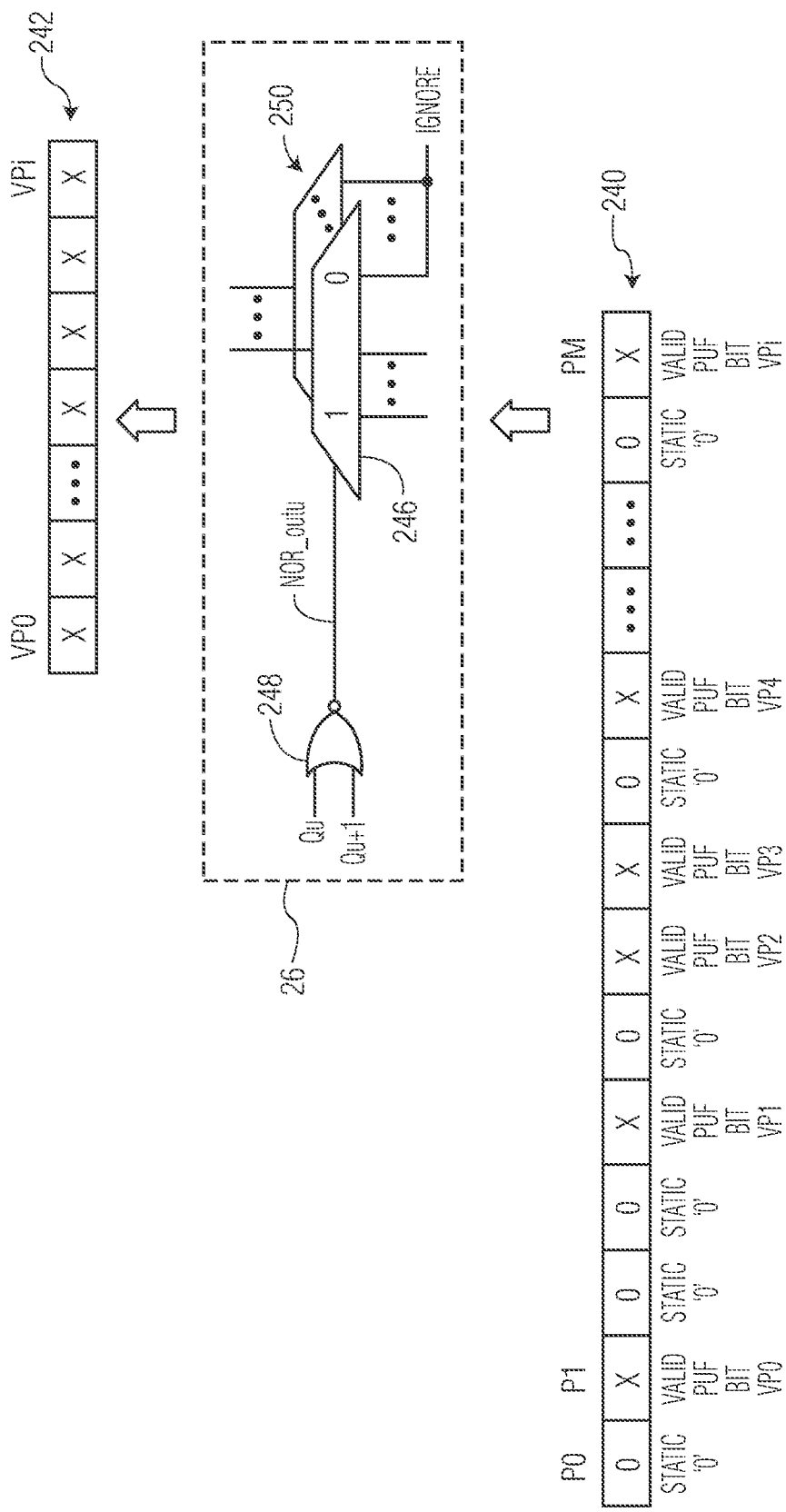
FIG. 6 illustrates, diagrammatic and schematic form, a portion of static '0' removal circuit of FIG. 1, in accordance with an embodiment of the present invention.

Enrollment will be described in reference to method 202, as well as in reference to FIGS. 5 and 6 which illustrate, in diagrammatic form, example data flows for method 202. Beginning with block 206, boot code or other SoC code (or both) is programmed into ROM 18. In some embodiments, there may only be boot code programmed into ROM 18, or alternatively, there may not be boot code at all but other SoC code or SoC parameters. Next, in block 218, for each WL of WL0-WLY, blocks 208, 210, and 212 are performed. In the illustrated embodiment in which K=X, each WL corresponds to one (X+1)-bit PUF word. Alternatively, such as in the case in which (X+1)=a multiple of (K+1) (and column MUXes are used), each WL may store (X+1)/(K+1) PUF words, and blocks 208, 210, and 212 can be performed for each PUF word. In block 208, the ROM data bits Q0-OK and differential bits (Dif0-DifM) are read from programmed ROM 18 to obtain potential differential PUF bits P0-PM. FIG. 5 illustrates a set of example values 240 for P0-PM. Each of the zeroes labeled as "static 0" corresponds to the situation in which the corresponding NOR_out is a zero, indicating that at least one bit cell of the corresponding selected differential PUF bit lacks a transistor (thus indicating an invalid PUF bit), as was described above. Each of the "X" values indicates a valid PUF bit in which both bit cells of the corresponding selected differential PUF bit includes a transistor such that the corresponding NOR_out is a one. In this case, the value of X is determined by the comparison between the corresponding bit cell currents of the corresponding selected differential PUF bit. As illustrated in FIG. 5, a subset of 240 provides valid PUF bits VP0-VPi.

Next, at block 210, the static 0's (corresponding to non-valid differential PUF bits) are removed by static 0 removal circuit 26, resulting in the set 242 of i+1 valid differential PUF bits VP0-VPi, as illustrated in FIG. 5. Although static 0 removal circuit 26 is illustrated as being in PUF evaluation engine 16 since it is used for both enrollment and evaluation, it could instead be located in enrollment circuitry 24 or elsewhere within system 10. FIG. 6 illustrates one embodiment of static 0 removal circuit 26, including a set of MUXes 250 which can be used for each of bits P0-PM to select whether to provide the corresponding P value at the output or to ignore the corresponding P value. The selection for each MUX is made by the corresponding NOR_out. For example, NOR gate 248 can be representative of any NOR gate in potential differential PUF bits generator 126 and receives the ROM bit value from the two bit cells (e.g. Qu and Qu+1) which form the potential differential PUF bit. The output of NOR gate 248, NOR_outu, is provided to the select input of MUX 246 which provides the value of the corresponding P bit at the output of static 0 removal circuit 26 when NOR_outu is one, but does not provide any value (i.e. ignores) the corresponding P bit when NOR_outu is zero.

Note that in illustrated embodiment, one MUX per potential differential PUF bit is illustrated, however, any number of MUXes, in any formation (stacked, etc.) with any logic combination of ROM bits to properly mask the invalid potential bits from values 240 and output the set 242 of valid potential differential PUF bits. Alternatively, any combination of logic elements may be used to perform the function of static 0 removal circuit 26. Also, since static 0 removal circuit filters static 0s (indicating non-valid PUF differential bits) to result in the set of valid differential PUF bits VP0-VPi, static 0 removal circuit can also be referred to as a filter circuit which filters out the invalid potential PUF bits to provide the valid potential PUF bits. In another embodiment, a different static value (e.g. a "1") or a different set of values may instead indicate an invalid PUF bit, depending on the logic used by potential differential PUF bits generator 126 to identify potential differential PUF bits as valid or invalid, in which the filter circuit would filter out all the invalid differential PUF bits.

Referring back to FIG. 4, at block 212, VP0-VPi can be further screened to identify robust valid differential PUF bits, RVP0-RVPj. For example, as illustrated in FIG. 5, robust bit screening circuit 28 can determine which of the set 242 of valid potential differential bits are sufficiently robust to result in a set 244 of j+1 robust valid differential PUF bits RVP0-RVPj. In an alternate embodiment, no additional screening is performed, in which VP0-VPi are provided as the robust valid differential PUF bits. If additional screening is performed, any known method of additional screening may be used to filter the set 244 of VP0-VPi to obtain RVP0-RVPj.

Figure 8:
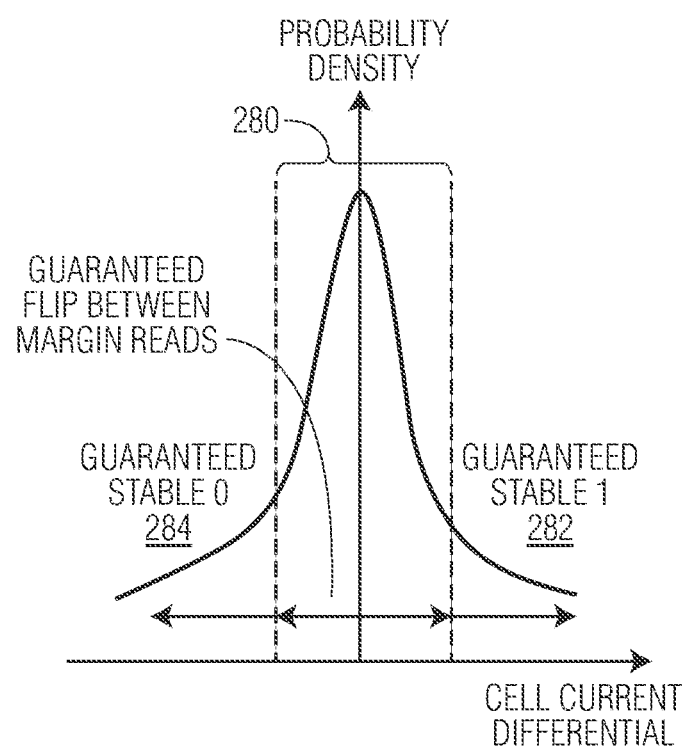
FIG. 8 illustrates a probability density chart in accordance with an example ROM.

For example, in one embodiment, the additional screening of block 212 is performed by skewing both transistors of the bit cells (which form the valid differential PUF bit) in opposite directions to determine if the output changes or not. If the output remains unchanged after the skewing in both directions, then the valid differential PUF bit is identified as a robust valid differential PUF bit (also referred to as a stable differential PUF bit since it overcomes the skew conditions). For example, a probability distribution of the cell current differential of the valid differential PUF bits of array 100 is qualitatively illustrated in FIG. 8. The distribution includes three regions: a guaranteed stable 0 region 284, a guaranteed stable 1 region 282, and an unstable region 280. The unstable region includes the collection of all valid differential PUF bits which are very closely matched and may change their logic state when the PUF read operation moves to a different combination of voltage (V) and temperature (T) conditions. In the stable 0 region 284, the differential PUF bits will be reliably read as a zero, even with different V and T combinations, and in stable 1 region 282, the valid differential PUF bits will be reliably read as a one, even with different V and T combinations. During enrollment, ROM 18 can be accessed in a specific way at a given V and T to determine which valid differential PUF bits fall in the unstable region, so that they may be avoided. Therefore, in one embodiment, the additional screening of block 212 identifies those valid differential PUF bits which fall in either region 284 or region 282 as robust or stable valid differential PUF bits. (Note that robust or stable valid differential PUF bits, e.g. RVP0-RVPj, may also be referred to more simply as robust or stable valid PUF bits, respectively.)

One method of skewing the transistors to determine the stable differential bits is described in U.S. Pat. No. 11,233, 663. In one example, a precharge circuit is used in ROM 18 to precharge the bit lines prior to each read operation. In one example, an always on source bias transistor, as well as a set of margin transistors coupled in parallel with the always one source bias transistor, are coupled to each of the source lines of the valid potential differential bits. The margin transistors corresponding to each source line can each be selectively enabled by a corresponding margin setting signal. A first set of margin transistors can be enabled during a first margin read to determine those unstable one bits which are like to flip to a zero with variations in voltage or temperature, and a second set of margin transistors can be selectively enabled during a second margin read to determine those unstable zero bits which are likely to flip to a one with variations in voltage or temperature. By selectively enabling the first or second set of margin transistors, a skew in the drive strength between the source lines of the differential PUF bit is created, in which enabling the first set for the first margin read results in a skew in one direction, and enabling the second set for the second margin read results in a skew in the opposite direction. By determining which differential bits can overcome these skew conditions and reliably output a same bit value under both skew conditions (i.e. during both margin reads), stable differential PUF bits can be identified.

In one embodiment, the size of unstable region 280 and the strength of the transistor skewing are a function of a given application for the PUF of ROM 18. For example, in an automotive application with a wide temperature region, unstable region 280 will be larger and contain more unstable valid differential PUF bits than an application with a commercial (and thus smaller) temperature range. Therefore, a technology evaluation may be performed to determine the margin settings and the desired yield of robust valid differential PUF bits in ROM 18.

Note that the identification of robust valid differential PUF bits can be performed using any desired method by screening circuit 28 in enrollment circuitry 24 communicating directly with ROM 18, or alternatively, can be performed via PUF evaluation engine 16 in which PUF evaluation engine 16 provides the addresses received from enrollment circuitry 24 and provides the outputs from ROM 18 back to enrollment circuitry 24.

Referring back to FIG. 4, after the set 244 of robust valid differential PUF bits RVP0-RVPj in ROM 18 have been identified, "good" address of PUF data units within ROM 18 can be determined in block 214. A PUF data unit can be any addressable size data unit of ROM 18, such as, e.g., words or subwords. A good address for a PUF data unit is one which addresses a PUF data unit that contains robust valid PUF bits or static 0's but no non-robust valid PUF bits. Since there may be far fewer robust valid differential PUF bits in ROM 18 than the total number of differential PUF bits (e.g. only about 25% of the differential PUF bits), it is difficult to identify addressable PUF data units which only include robust valid differential PUF bits. Therefore, the good addresses can be identified as those which address PUF data units which contain robust valid PUF bits and static 0s (which can easily be filtered out when needed), but do not contain any non-robust valid PUF bits. These good address can then be stored in in NVM 22 for use during evaluation, such as when in normal operation in the field. By allowing the good addresses to address PUF data units with static 0's (and filtering them out as needed), addressable PUF data units may be easier to identify and save in NVM 22, as opposed to saving bit addresses for individual robust valid differential PUF bits.

Also, in block 216, the identified robust valid differential PUF bits can be used to generate one or more digital codes for use in security applications by system 10. For example, the robust valid differential PUF bits can be used to generate hash and ECC bits for a key which can be used to securely store information on chip. The resulting one or more digital codes generated from the robust valid differential PUF bits can include any number of bits (depending on the number of available robust valid differential PUF bits in ROM 18). Any generated digital code will be reliable and stable, even across voltage and temperature changes, and also does not affect the programmed information (e.g. programmed code) in the ROM. In this manner, a dedicated ROM is not needed for the PUF, as the boot ROM or other programmed ROM or other programmed memory of the chip can be used to provide a PUF.

Enrollment, as described in FIG. 4, may be performed off-chip, in which enrollment circuitry 24 is located off-chip with respect to ROM 18, PUF evaluation engine 16, security module 14, and processor core 12, such as in an external tester. Helper data NVM 22 may be located on the same IC as PUF evaluation engine 16, and may be implemented using electrically programmable fuses. Alternatively, NVM 22 may be located off-chip with enrollment circuitry 24 and used during enrollment, but after final test the helper data from NVM 22 may be stored within storage circuitry elsewhere in data processing system 10, or within PUF evaluation engine 16. In another embodiment, enrollment circuitry 24 is located on-chip with ROM 18, PUF evaluation engine 16, and NVM 22, in which enrollment can be performed anytime in the field, and not just during final test in manufacturing.

Figure 7:
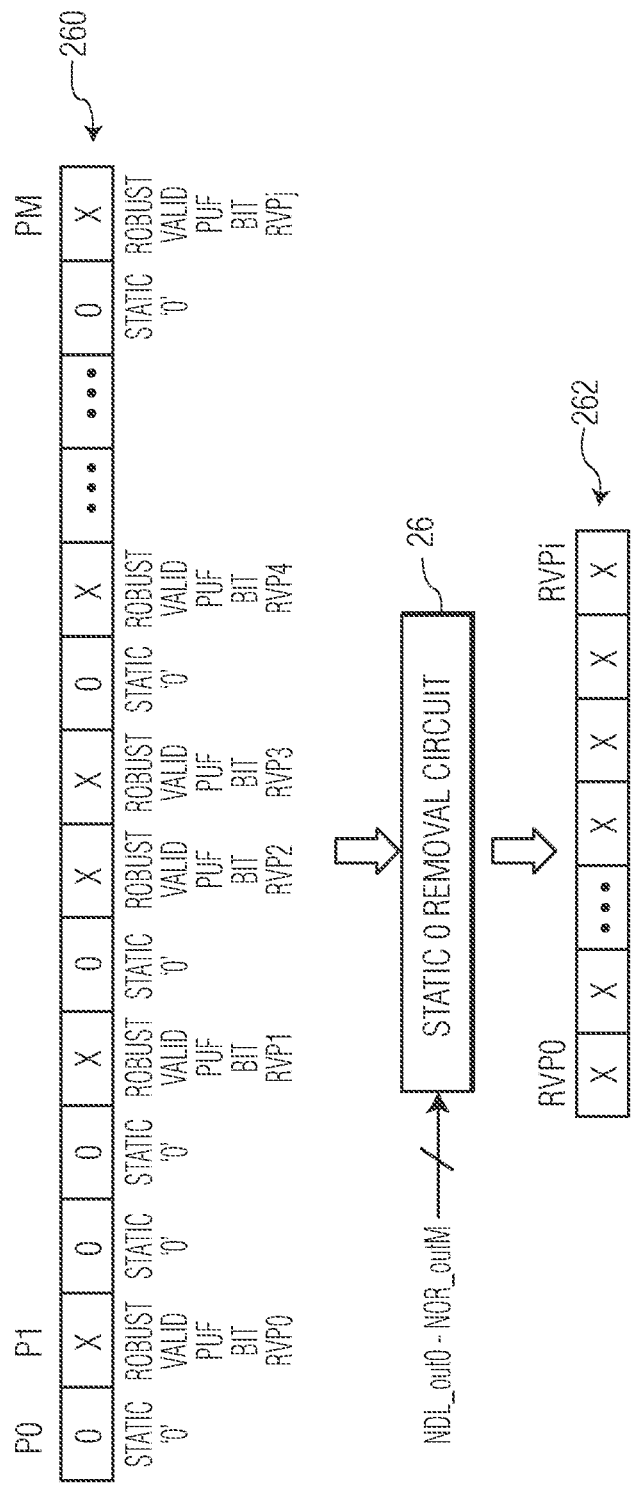
FIG. 7 illustrates, in diagrammatic form, a data flow corresponding to the evaluation method of FIG. 4, in accordance with an embodiment of the present invention.

Evaluation (i.e. reconstruction) will be described in reference to method 204 of FIG. 4, as well as in reference to FIG. 7 which illustrates, in diagrammatic form, an example data flow for method 204. Beginning with block 222, the good addresses are obtained from NVM 22 (which can be embedded in system 10 or can be an external memory). These good addresses were previously described above in reference to enrollment, in which the good addresses each address an addressable PUF data unit which includes either robust valid differential PUF bits or static zero bits, but no non-valid differential PUF bits. (In the case that additional screening of the valid PUF bits for robust valid PUF bits is not performed, then the addressable PUF data units include either valid differential PUF bits or static zero bits, but, as before, no non-valid differential PUF bits.)

Next, at block 224, the PUF data units are read from the good addresses (as identified in NVM 22) of programmed ROM 18. As a result of reading the PUF data units, a set 260 of potential differential bits P0-PM is obtained, which includes robust valid differential PUF bits as well as static zero bits, as illustrated in FIG. 7. P0-PM obtained during evaluation does not include any non-valid differential PUF bits, nor any non-robust valid differential PUF bits. Next, at block 226, the static zeros are removed from the obtained PUF data units in order to regenerate or reconstruct the robust valid PUF bits. As illustrated in FIG. 7, this can be performed by static 0 removal circuit 26 using NOR_out0-NOR_outM, as was described above for the enrollment process. That is, the same static 0 removal circuit can be used since the NOR gate outputs still identify which differential PUF bits qualify as valid differential PUF bits, and since only robust valid differential PUF bits and static zeros were identified by the good addresses, the removal of any static zeros results in a set 262 of robust valid differential PUF bits RVP0-RVPi.

In block 228, these identified RVP0-RVPj bits are used to generate the digital code on-chip when needed. For example, these can be used to generate the hash and ECC bits in order to determine the key. This key can be used to unlock secure information on-chip which was stored with this key, such as during manufacture. Note that the secure information will only unlock if the right key is reconstructed, and if the secure information cannot be unlocked, then the access attempt was made with an incorrect key. In this manner, the key provides self-affirmation of the security measure.

Therefore, by now it can be appreciated how a PUF can be embedded in a memory, such as within a ROM which has already been programmed with code. The PUF can be accessed without disturbing the stored information. In one embodiment, a first set of sense-amps is used to sense ROM data from selected word lines to output stored data bits from the ROM, while a second set of differential sense-amps is used to sense a current differential between two bit lines and output potential differential PUF bit values from the ROM. The data bits from the ROM can then be used to determine which of the potential differential PUF bits are valid differential PUF bits. Additional screening can then be performed to further determine which of the valid differential PUF bits are considered sufficiently stable (i.e. robust). These robust valid differential PUF bits are then used to generate a unique digital code for the chip containing the ROM. The unique code can be regenerated from the ROM, once in the field during normal operation, and will provide the same value regardless of variations temperature and voltage due to the stability of the ROM. Any code or data stored in the ROM remains undisturbed and otherwise useable as needed. that is, the bit cells of the valid differential PUF bits can simultaneously be used to store ROM data needed for other operations. In this manner, embedding a PUF into an on-chip memory negates the need for a separate, dedicated memory to provide the PUF (in which the dedicated memory is only used to provide the PUF and not store other data).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a system includes an array of bit cells programmed with user data, wherein existence of a transistor in a bit cell indicates a first logic state of a corresponding stored bit of the user data and lack of the transistor in the bit cell indicates a second logic state of the corresponding stored bit of the user data, wherein the array of bit cells is arranged in rows and columns, wherein each row includes a corresponding word line and each column includes a corresponding column line; a plurality of differential PUF bits in the array, each differential PUF bit including a first bit cell of the array of bit cells programmed with user data and a second bit cell of the array of bit cells programmed with user data; a first set of sense-amplifiers coupled to the column lines of the array and configured to output from the array a set of data bits of the user data stored at a selected word line and selected column lines; a second set of sense-amplifiers coupled to the column lines of the array and configured to output a set of differential output bits, each differential output bit based on a differential current between two columns lines of the selected column lines corresponding to the first and second bit cells of a corresponding differential PUF bit along the selected word line; and a potential PUF bit generator configured to output a set of potential PUF bits from the array based on the set of data bits of the user data from the first set of sense-amplifiers and the set of differential output bits from the second set of sense-amplifiers. In one aspect, the array is further characterized as a read only memory (ROM) array. In a further aspect, existence of an N-type transistor in the bit cell connected to a corresponding word line and a corresponding column line indicates the first logic state of the corresponding stored bit of the user data and lack of the N-type transistor in the bit cell indicates the second logic state of the corresponding stored bit of the user data. In another further aspect, the user data includes boot code such that the ROM is further characterized as a boot ROM. In another aspect of this embodiment, each sense-amplifier of the first set of sense-amplifiers has a first input coupled to a selected column line of the array, a second input coupled to a reference, and is configured to output a corresponding data bit of the set of data bits based on a comparison between the first and second inputs. In aa further aspect, each sense-amplifier of the second set of sense-amplifiers has a first input coupled to a first selected column line of the array, a second input coupled to a second selected column line of the array, and is configured to output a corresponding differential output bit of the set of differential output bits based on a voltage or current differential between the first and second selected column lines. In a further aspect, the first and second column lines of the array include neighboring bit lines of the array. In yet another aspect of this embodiment, each potential PUF bit of the set of potential PUF bits corresponds to a respective selected differential PUF bit of the plurality of differential PUF bits along the selected word line and is generated based on two columns lines of the respective selected differential PUF bit and the stored bits of the user data of the first and second bit cells of the respective selected differential PUF bit. In a further aspect, when each of the first and second bit cells of the respective selected differential PUF bit includes a corresponding transistor, the corresponding potential PUF bit is a valid PUF bit, and when both the first and second bit cells of the respective differential PUF bit lack the corresponding transistor, the corresponding potential PUF bit is a predetermined value. In a further aspect, when the respective selected differential PUF bit is a valid PUF bit, the corresponding potential PUF bit provides a differential output bit of a corresponding sense-amp of the second set of sense-amps coupled to the two column lines of the respective selected differential PUF bit. In yet a further aspect, the system further includes evaluation circuitry configured to filter out potential PUF bits of the set of potential PUF bits which have the predetermined value to obtain only valid PUF bits of the set of potential PUF bits. In a further aspect, the evaluation circuitry is further configured to generate a unique digital code for the system using only the valid PUF bits of the set of potential PUF bits. In yet a further aspect, the valid PUF bits of the set of potential PUF bits are further characterized as robust valid PUF bits which have been further screened to determine stability across voltage and temperature variations. In yet another aspect, the potential PUF bit generator includes, for each potential PUF bit, an AND gate having a first input coupled to a logical combination of two data bits of the set of data bits stored at the first and second bit cells of a selected differential PUF bit along the selected word line and a second input coupled to receive a corresponding differential output bit of the set of differential output bits based on a differential between column lines of the first and second bit cells of the selected differential PUF bit. In a further aspect, for each potential PUF bit, the logical combination of the two data bits stored at the first and second bit cells of the select differential PUF bit indicates whether or not the selected differential PUF bit cell is valid. In yet a further aspect, for each potential PUF bit, the selected differential PUF bit is valid only if the first and second bit cells of the selected differential PUF bit each include a transistor such that the stored bits of user data in the first and second bit cells of the selected differential PUF bit have a same logic state.

In another embodiment, a system includes a boot ROM including an array of bit cells programmed with boot code, wherein existence of a transistor in a bit cell indicates a first logic state of a corresponding stored bit of the boot code and lack of the transistor in the bit cell indicates a second logic state of the corresponding stored bit of the boot code, wherein the array of bit cells is arranged in rows and columns, wherein each row includes a corresponding word line and each column includes a corresponding bit line; differential PUF bits embedded in the array of the boot ROM, each differential PUF bit including a first bit cell of the array of bit cells programmed with boot code and a second bit cell of the array of bit cells programmed with boot code; a first set of sense-amplifiers coupled to the bit lines of the array and configured to output from the array a set of data bits of the boot code stored at a selected word line and selected bit lines; a second set of sense-amplifiers coupled to the bit lines of the array and configured to output a set of differential output bits, each differential output bit based on a voltage or current differential between two bit lines of the selected bit lines corresponding to the first and second bit cells of a corresponding differential PUF bit along the selected word line; a potential PUF bit generator configured to output a set of potential PUF bits from the array based on the set of data bits of the user data from the first set of sense-amplifiers and the set of differential output bits from the second set of sense-amplifiers; and a filter circuit configured to receive the set of potential PUF bits from the potential PUF bit generator to identify a subset of the potential PUF bits as valid PUF bits thereby filtering out any invalid PUF bits from the set of potential PUF bits. In one aspect of the another embodiment, each potential PUF bit of the set of potential PUF bits corresponds to a selected differential PUF bit along the selected word line, and is only a valid PUF bit when each of the first and second bit cells of the selected differential PUF bit includes a corresponding transistor such that both the first and second bit cells of the selected differential PUF bit store a same logic state. In another aspect, the potential PUF bit generator is configured to, for each potential PUF bit, provide a differential output bit of from a corresponding sense-amp of the second set of sense-amps which is coupled to the two bit lines of the corresponding differential PUF bit along the selected word line when the potential PUF bit is valid, but provide a predetermined logic state when the potential PUF bit is not valid, regardless of the differential output bit from the corresponding sense-amp of the second set of sense-amps. In a further aspect, the filter circuit is configured to use the set of data bits of the boot code stored at the selected word line and selected bit lines to filter out the invalid PUF bits from the set of potential PUF bits.

What is claimed is:

1. A system comprising:
   an array of bit cells programmed with user data, wherein existence of a transistor in a bit cell indicates a first logic state of a corresponding stored bit of the user data and lack of the transistor in the bit cell indicates a second logic state of the corresponding stored bit of the user data, wherein the array of bit cells is arranged in rows and columns, wherein each row comprises a corresponding word line and each column comprises a corresponding column line;
   a plurality of differential PUF bits in the array, each differential PUF bit including a first bit cell of the array of bit cells programmed with user data and a second bit cell of the array of bit cells programmed with user data;
   a first set of sense-amplifiers coupled to the column lines of the array and configured to output from the array a set of data bits of the user data stored at a selected word line and selected column lines;
   a second set of sense-amplifiers coupled to the column lines of the array and configured to output a set of differential output bits, each differential output bit based on a differential current between two columns lines of the selected column lines corresponding to the first and second bit cells of a corresponding differential PUF bit along the selected word line; and
   a potential PUF bit generator configured to output a set of potential PUF bits from the array based on the set of data bits of the user data from the first set of sense-amplifiers and the set of differential output bits from the second set of sense-amplifiers.

2. The system of claim 1, wherein the array is further characterized as a read only memory (ROM) array.

3. The system of claim 2, wherein existence of an N-type transistor in the bit cell connected to a corresponding word line and a corresponding column line indicates the first logic state of the corresponding stored bit of the user data and lack of the N-type transistor in the bit cell indicates the second logic state of the corresponding stored bit of the user data.

4. The system of claim 2, wherein the user data comprises boot code such that the ROM is further characterized as a boot ROM.

5. The system of claim 1, wherein each sense-amplifier of the first set of sense-amplifiers has a first input coupled to a selected column line of the array, a second input coupled to a reference, and is configured to output a corresponding data bit of the set of data bits based on a comparison between the first and second inputs.

6. The system of claim 5, wherein each sense-amplifier of the second set of sense-amplifiers has a first input coupled to a first selected column line of the array, a second input coupled to a second selected column line of the array, and is configured to output a corresponding differential output bit of the set of differential output bits based on a voltage or current differential between the first and second selected column lines.

7. The system of claim 6, wherein the first and second column lines of the array comprise neighboring bit lines of the array.

8. The system of claim 1, wherein each potential PUF bit of the set of potential PUF bits corresponds to a respective selected differential PUF bit of the plurality of differential PUF bits along the selected word line and is generated based on two columns lines of the respective selected differential PUF bit and the stored bits of the user data of the first and second bit cells of the respective selected differential PUF bit.

9. The system of claim 8, wherein when each of the first and second bit cells of the respective selected differential PUF bit includes a corresponding transistor, the corresponding potential PUF bit is a valid PUF bit, and when both the first and second bit cells of the respective differential PUF bit lack the corresponding transistor, the corresponding potential PUF bit is a predetermined value.

10. The system of claim 9, wherein when the respective selected differential PUF bit is a valid PUF bit, the corresponding potential PUF bit provides a differential output bit of a corresponding sense-amp of the second set of sense-amps coupled to the two column lines of the respective selected differential PUF bit.

11. The system of claim 10, further comprising evaluation circuitry configured to filter out potential PUF bits of the set of potential PUF bits which have the predetermined value to obtain only valid PUF bits of the set of potential PUF bits.

12. The system of claim 11, wherein the evaluation circuitry is further configured to generate a unique digital code for the system using only the valid PUF bits of the set of potential PUF bits.

13. The system of claim 12, wherein the valid PUF bits of the set of potential PUF bits are further characterized as robust valid PUF bits which have been further screened to determine stability across voltage and temperature variations.

14. The system of claim 1, wherein the potential PUF bit generator comprises, for each potential PUF bit, an AND gate having a first input coupled to a logical combination of two data bits of the set of data bits stored at the first and second bit cells of a selected differential PUF bit along the selected word line and a second input coupled to receive a corresponding differential output bit of the set of differential output bits based on a differential between column lines of the first and second bit cells of the selected differential PUF bit.

15. The system of claim 14, wherein, for each potential PUF bit, the logical combination of the two data bits stored at the first and second bit cells of the select differential PUF bit indicates whether or not the selected differential PUF bit cell is valid.

16. The system of claim 15, wherein, for each potential PUF bit, the selected differential PUF bit is valid only if the first and second bit cells of the selected differential PUF bit each include a transistor such that the stored bits of user data in the first and second bit cells of the selected differential PUF bit have a same logic state.

17. A system comprising:
   a boot ROM including an array of bit cells programmed with boot code, wherein existence of a transistor in a bit cell indicates a first logic state of a corresponding stored bit of the boot code and lack of the transistor in the bit cell indicates a second logic state of the corresponding stored bit of the boot code, wherein the array of bit cells is arranged in rows and columns, wherein each row comprises a corresponding word line and each column comprises a corresponding bit line;
   differential PUF bits embedded in the array of the boot ROM, each differential PUF bit including a first bit cell of the array of bit cells programmed with boot code and a second bit cell of the array of bit cells programmed with boot code;
   a first set of sense-amplifiers coupled to the bit lines of the array and configured to output from the array a set of data bits of the boot code stored at a selected word line and selected bit lines;

a second set of sense-amplifiers coupled to the bit lines of the array and configured to output a set of differential output bits, each differential output bit based on a voltage or current differential between two bit lines of the selected bit lines corresponding to the first and second bit cells of a corresponding differential PUF bit along the selected word line;

a potential PUF bit generator configured to output a set of potential PUF bits from the array based on the set of data bits of the user data from the first set of sense-amplifiers and the set of differential output bits from the second set of sense-amplifiers; and a filter circuit configured to receive the set of potential PUF bits from the potential PUF bit generator to identify a subset of the potential PUF bits as valid PUF bits thereby filtering out any invalid PUF bits from the set of potential PUF bits.

18. The system of claim 17, wherein each potential PUF bit of the set of potential PUF bits corresponds to a selected differential PUF bit along the selected word line, and is only a valid PUF bit when each of the first and second bit cells of the selected differential PUF bit includes a corresponding transistor such that both the first and second bit cells of the selected differential PUF bit store a same logic state.

19. The system of claim 17 wherein the potential PUF bit generator is configured to, for each potential PUF bit, provide a differential output bit of from a corresponding sense-amp of the second set of sense-amps which is coupled to the two bit lines of the corresponding differential PUF bit along the selected word line when the potential PUF bit is valid, but provide a predetermined logic state when the potential PUF bit is not valid, regardless of the differential output bit from the corresponding sense-amp of the second set of sense-amps.

20. The system of claim 19, wherein the filter circuit is configured to use the set of data bits of the boot code stored at the selected word line and selected bit lines to filter out the invalid PUF bits from the set of potential PUF bits.

* * * * *